(No Model.)  2 Sheets—Sheet 1.

A. E. SCHEVEY.
COTTON CHOPPER.

No. 530,724.  Patented Dec. 11, 1894.

Witnesses:
John Enders Jr.
L. M. Buckley

Inventor
Alvin E. Schevey
by Charles C. Buckley
Attorney.

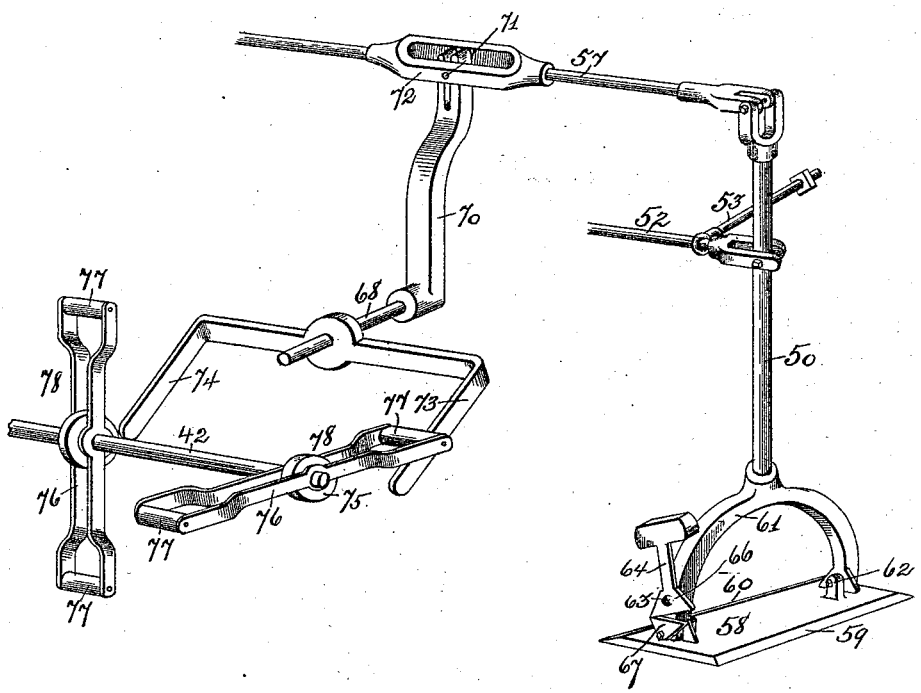

UNITED STATES PATENT OFFICE.

ALVIN E. SCHEVEY, OF MAYFAIR, ILLINOIS.

COTTON-CHOPPER.

SPECIFICATION forming part of Letters Patent No. 530,724, dated December 11, 1894.

Application filed June 20, 1894. Serial No. 515,091. (No model.)

*To all whom it may concern:*

Be it known that I, ALVIN E. SCHEVEY, of Mayfair, in the county of Cook and State of Illinois, have invented an Improvement in Cotton-Choppers, of which the following is a specification.

My invention has for its object the provision of means by which a plurality of continuously extended rows of partly grown cotton may be acted upon in unison, by which the chopper hoe blades or knives are positively actuated with mechanism simple in character, by which the hoe blades or knives are adapted automatically to change their cutting position as the hoes act first upon one side of the row of stalks and then upon the other; and by which the hoes are maintained during the oscillation in parallel positions.

My invention has certain other objects in view and consists in certain features pointed out in my claims and in the detailed description, reference being now had to the accompanying drawings, in which—

Figure 1:
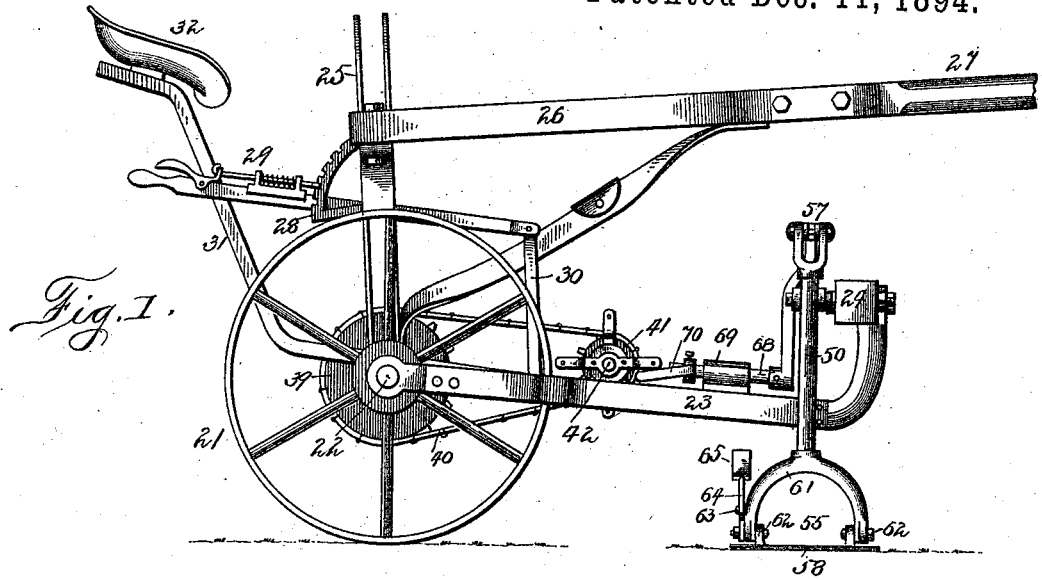
Figure 2:
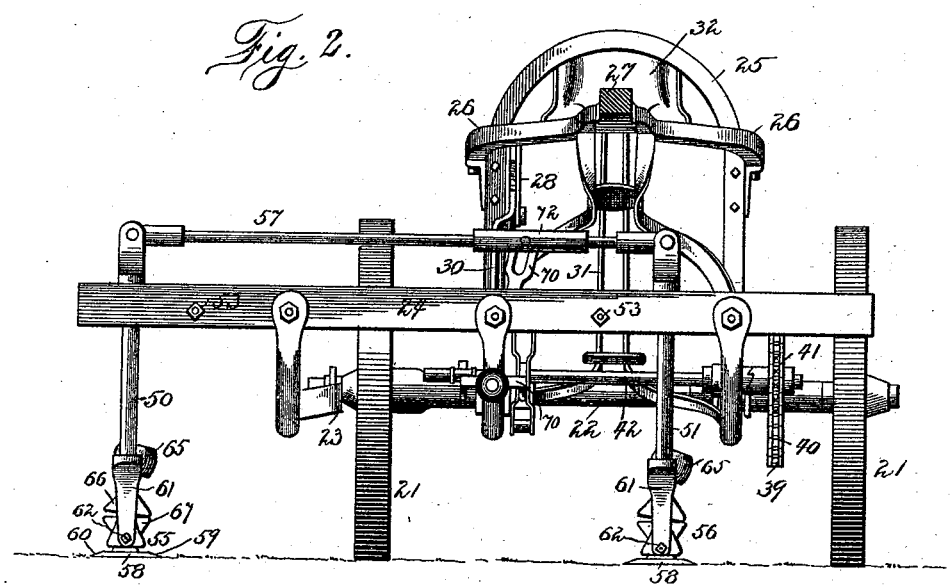

Figure 1 is a side view of the cotton chopper. Fig. 2 is an end view of same. Fig. 3 is a detail perspective view of the mechanism for operating the choppers, also illustrating the swinging chopper hoe blades or knives.

I will first proceed to a description of the construction of the frame and mountings of the machine comprising the traction wheels 21 mounted upon the axle 22 from which latter the supporting frame bars 23 extend forwardly to and support the transverse carrier beam 24. Mounted upon the axle 22 is the arch bar 25 to which the hounds 26 of the tongue 27 are attached; also mounted upon and secured to this arch bar 25 is the notched segment 28 which holds in various positions the hand lever 29 connected with the lifting bar 30, which latter is secured to one of the frame bars 23. Held to the frame bars 23 and also upon the axle 22 is the rearwardly extended seat support 31 carrying the seat 32 in such proximity to the hand lever 29 as that the operator from his position on the seat may readily grasp the handle 29 and manipulate the same to raise and lower the carrier beam 24 and thus raise and lower the front part of the machine. It is evident that in thus disposing the seat 32 and by virtue of the arrangement of the frame and disposition of the tongue the weight of the operator on the seat 32 serves to relieve the horses from supporting the weight of the machine, since the frame and seat together with the parts of the machine held thereby are adapted to move independently of the tongue and its support.

Referring now to the mechanism for chopping out the partly grown plant so as to form spaces intermediate between the plants or stocks left standing, the hoe oscillating carrier rods, designated at 50 and 51, are pivoted respectively to the separator bar 52, which latter is secured to the carrier beam 24 by means of the bolt 53, having perforated heads embracing the said separator bar 52, so that the said bar may move or rock on its connection with the carrier beam 24 in order to maintain the hose in a proper relative position to the soil notwithstanding the movements of the machine. The tool oscillating carriers 50, 51, for the hoes 55 and 56, are connected together by means of the actuator bar 57 which latter is moved longitudinally back and forth to cause the said carriers 50 and 51 to oscillate back and forth. The hoes 55 and 56 comprise the blades or knives 58 having two cutting edges on either side thereof at 59 and 60. The carriers 50, 51 are bifurcated at 61 and the ends of the bifurcation are pivotally connected at 62 with the hoe blades or knives 58 which latter, therefore, have a tilting movement independent of their carriers. Pivoted at 63 on one of the bifurcations 61 of the carriers 50 and 51 is the arm 64 having at its upper end the weight 65, the lower portion of said arm 64 at its pivot 63 being provided with an angle plate 66, the one side of which bears against and rides upon the face of the angle plate 67 fixed on the hoe blade or knife 58.

The operation of this latter device is as follows: As the carriers 50 and 51 are oscillated back and forth the blades or knives 58 of the hoes are brought into position first on one side of the row of stalks and then on the other and it therefore becomes necessary for each side or cutting edge 59 and 60 to be brought automatically into cutting position relatively to the rows of stalks. It is evident that as the carriers and hoes are oscillated that the center of gravity of the weighted arms 64 is changed so that said arms are moved upon their pivot 63 back and forth in a direction opposite to the direction of movement of the carriers 50 and 51 and the angle plate 66 is thus caused to ride upon the face of the angle plate 67 of the hoe blade and tilt the hoe blade first in one direction and then in the other so as to bring alternately each one of its cutting edges into the relative plane necessary to perform the operation of chopping.

Referring now to the mechanism for moving the actuator bar 57 back and forth to operate the carriers and thus bring the hoe into proper positions to perform the operation of chopping, I mount and secure on the countershaft 42, the chopper actuating mechanism, which comprises the rock shaft 68 mounted longitudinally on the frame bar 23 by means of the bearing box 69 and carrying at the end nearest the carrier beam 24 the fork rocking lever 70 which latter engages a stud 71 held in the loop 72 of the actuator bar 57. The end of the rock shaft 68 has secured thereto the elbow shaped impact arms 73 and 74 which are slightly inclined downward. Mounted upon the countershaft 42 and fixed thereon are collars 75 to which are rigidly secured the side pieces 76 carrying at their ends the antifriction rollers 77, 77. These side pieces 76 and antifriction rollers 77 constitute rotated actuator arms which may be designated generally as 78 and since they are duplicated and arranged side by side at right angles it is evident that there are four of these actuator arms 78 mounted rigidly on the shaft 42 so that when this shaft 42 is rotated the said arms are successively brought into such positions as that the rollers 77 respectively strike against and bear upon the impact arms 73 and 74 and thus impart a movement of oscillation to the shaft 68 which movement by reason of the successive action of the arm 78 first upon one impact arm 73 and then upon the other 74 is but partial and therefore the shaft 68 is rocked and the lever 70 also rocked back and forth to move the actuator rod back and forth and position the hoes first upon one side of the row of stalks and then upon the other and at the same time the gravity devices, previously described and carried upon the blades or knives of the hoes, tilts the latter into chopping position. The driving mechanism is so timed relative to the movement of the hoes as that the latter are brought properly into a position first on one side and then on the other side of the row of stalks in such a manner as that in the advancement of the machine the stalks are severed and cut out of the ground to leave the proper interval or space between the plants or stalks left standing.

Since four of the actuator arms are mounted upon the countershaft in such a manner as that the impact arms are alternately engaged, it is evident that in one complete rotation of said shaft the carriers and their hoes are oscillated back and forth twice.

It is further apparent that with my improved type of hoe blades or knives adapted to automatically change their cutting position the stalks are removed and the soil also treated with the least possible degree of disturbance, the mechanically operated hoes in result simulating that of the hand operated hoe.

Having thus described my invention, what I claim as new therein, and desire to secure by Letters Patent, is—

1. In a cotton chopper the combination with pivoted oscillated carriers, hoes mounted thereon, an actuator bar pivotally connected with the carriers, a driven counter shaft rotating actuator arms to successively bring the same first against one impact arm of a rock shaft and then against the other and transmitting mechanism between the impact arms and the actuator bar.

2. A hoe for a cotton chopper which hoe is positioned first upon one side of the row of stalks and then upon the other comprising a pivoted or hinged blade or knife and gravity mechanism adapted to tilt the pivoted blade and bring the same into proper relative chopping position as the hoe is shifted.

3. A hoe for a cotton chopper which is adapted to be positioned first upon one side and then upon the other of the rows of stalks comprising a pivoted or hinged blade or knife and automatically operating shifting mechanism for tilting the blade or knife alternately into the proper cutting positions.

4. A hoe for a cotton chopper which is adapted to be positioned first upon one side and then upon the other of the rows of stalks, comprising a pivoted or hinged blade or knife, a pivoted and weighted tilting arm adapted to oscillate in the change of position of the blades or knives and tilt the latter to bring the same into proper cutting position.

5. In a cotton chopper, the combination with pivoted oscillated carriers, means for oscillating the same and a hoe blade or knife pivotally mounted upon the carriers and automatically operating shifting mechanism for tilting the blade or knife alternately into the proper cutting position.

6. In a cotton chopper, the combination with pivoted oscillated carriers, hoes mounted thereon, an actuator bar pivotally connected with the carriers, a driven counter shaft rotating actuator arms to bring the same first against one impact arm on a rock shaft and then against the other and transmitting mechanism between the impact arms and the actuator bar together with pivoted or hinged blades or knives of the hoes and automatically operating shifting mechanism for tilting the blades or knives alternately into the proper cutting positions.

7. In a cotton chopper, pivoted oscillated carriers, tilting hose carried thereby and intermittently operating mechanism for oscillating said carriers.

8. In a cotton chopper, pivoted oscillated carriers, tilting hose carried thereby, a rock shaft for oscillating the pivoted carriers and means for operating the rock shaft.

9. In a cotton chopper, pivoted oscillated carriers, tilting hoes carried thereby, intermittently operating mechanism for oscillating the carriers and a separator bar between the said carriers.

In testimony whereof I have set my hand, this 11th day of June, 1894, in the presence of two witnesses.

ALVIN E. SCHEVEY.

Witnesses:
  L. M. BULKLEY,
  C. C. BULKLEY.